United States Patent
Kimura et al.

(10) Patent No.: US 7,053,155 B2
(45) Date of Patent: May 30, 2006

(54) VIBRATION DAMPING RUBBER COMPOSITION

(75) Inventors: Norihito Kimura, Kasugai (JP); Fumihiko Jinno, Kasugai (JP); Takehiko Taguchi, Nagoya (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 11/006,672

(22) Filed: Dec. 8, 2004

(65) Prior Publication Data

US 2005/0124766 A1    Jun. 9, 2005

(30) Foreign Application Priority Data

Dec. 9, 2003 (JP) .............. 2003-410584
Oct. 28, 2004 (JP) .............. 2004-314428

(51) Int. Cl.
*C08C 19/00* (2006.01)
*C08F 8/34* (2006.01)

(52) U.S. Cl. ............... 525/332.7; 525/332.5; 525/333.6; 525/374; 525/383; 525/192; 525/232; 525/177; 525/184

(58) Field of Classification Search ............... 525/383, 525/374, 333.6, 332.5, 332.7, 192, 232, 98, 525/164, 177, 184
See application file for complete search history.

(56) References Cited

U.S. PATENT DOCUMENTS 2,989,504 A * 6/1961 Little .................. 525/151
3,219,091 A * 11/1965 Iknayan ............... 152/209.5
5,159,980 A * 11/1992 Onan et al. ............ 166/294

FOREIGN PATENT DOCUMENTS

| EP | 0823453    | 2/1998  |
|----|------------|---------|
| JP | 2-284935   | 11/1990 |
| JP | 3-54235    | 3/1991  |
| JP | 4-136049   | 5/1992  |
| JP | 07-268148  | 10/1995 |
| JP | 08-073660  | 3/1996  |
| JP | 11-106567  | 4/1999  |

OTHER PUBLICATIONS

European Search Report dated Apr. 7, 2005.

* cited by examiner

*Primary Examiner*—Ling-Sui Choi
(74) *Attorney, Agent, or Firm*—Armstrong, Kratz, Quintos, Hanson & Brooks, LP

(57) ABSTRACT

A vibration damping rubber composition capable of exhibiting an excellent vibration damping property comprising:
(A) a diene rubber;
(B) a bismaleimide compound represented by the following general formula (1);

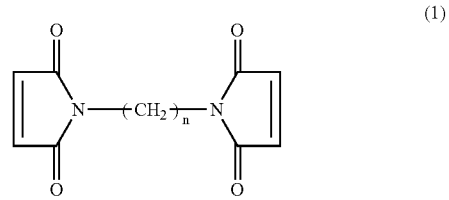

(1)

wherein n denotes an integer of 4 to 12; and
(C) a vulcanization accelerator;
wherein said rubber composition does not contain elemental sulfur as a raw material for a vulcanizing agent.

2 Claims, No Drawings

VIBRATION DAMPING RUBBER COMPOSITION

BACKGROUND OF THE INVENTION

1. Field of the Invention

The present invention relates to a vibration damping rubber composition, and more particularly, to a vibration damping rubber composition suitable for use in an engine mount and the like for supporting an engine of an automobile and the like, and also for restricting transmission of vibration of such an engine.

2. Description of the Art

Heretofore, a rubber composition, for example, obtained by adding a sulfur vulcanizing agent or a sulfur vulcanization accelerator to a rubber material such as natural rubber or synthetic rubber has been used as a vibration damping rubber composition. However, such a rubber composition tends to harden after long-term use (or after thermal aging) and becomes inferior in a vibration damping property.

It is thought that such thermal deterioration may be caused by the following reasons; (a) an increase of crosslinking density due to a change of polysulfide bonds to disulfide or monosulfide bonds; (b) oxidative aging of the rubber material; and (c) crosslinking due to a sulfur vulcanizing agent.

Countermeasures have been taken for the above-mentioned problems; by forming monosulfide-rich crosslinking for the above-mentioned problem (a); adding an antioxidant for the above-mentioned problem (b); and minimizing the blend amount of a sulfur vulcanizing agent for the above-mentioned problem (c). However, hardening of rubber cannot be totally restricted after long-term use (or after thermal aging), resulting in an inferior vibration damping property for the rubber.

Therefore, to solve these problems in terms of maintaining the vibration damping property, various rubber compositions using a bismaleimide compound as a vulcanizing agent have been proposed (see, for example, Japanese Unexamined Patent Publication Nos. 2-284935 and 4-136049, and Japanese Patent Publication No. 7-122006).

However, each of rubber compositions proposed by the above-mentioned publications uses a sulfur vulcanizing agent along with a bismaleimide compound. Therefore, the rubber composition tends to be disadvantageous in that a sufficient vibration damping property cannot be obtained because crosslinking proceeds by means of the sulfur vulcanizing agent so that the rubber becomes hard.

In view of the foregoing, it is an object of the present invention to provide a vibration damping rubber composition capable of exhibiting an excellent vibration damping property.

SUMMARY OF THE INVENTION

To achieve the aforesaid object, the vibration damping rubber composition according to the present invention comprises (A) a diene rubber; (B) a bismaleimide compound represented by the following general formula (1);

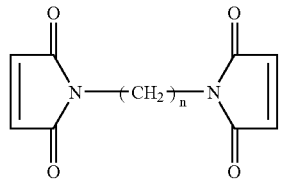

wherein n denotes an integer of 4 to 12; and (C) a vulcanization accelerator; wherein the rubber composition does not contain elemental sulfur as a raw material for a vulcanizing agent.

The inventors of the present invention have conducted intensive studies to obtain a vibration damping rubber composition capable of exhibiting an excellent vibration damping property. During their studies, they focused upon a vulcanizing system wherein only a specific bismaleimide compound is included as a vulcanizing agent and elemental sulfur is not included as a raw material for the vulcanizing agent. As a result, the inventors have found that in the vulcanizing system a vulcanization accelerator is required in combination with a bismaleimide compound to improve the crosslinking reactivity of the bismaleimide compound as a vulcanizing agent. As a result, the inventors finally found that the aforesaid object can be achieved by a vibration damping rubber composition including a diene rubber, a specific bismaleimide compound and a vulcanization accelerator, however, not including elemental sulfur as a raw material for a vulcanizing agent. Thus, the inventors attained the present invention.

Since the inventive vibration damping rubber composition includes a specific bismaleimide compound as a vulcanizing agent and also includes a vulcanization accelerator, however, does not include elemental sulfur as a raw material for a vulcanizing agent, rubber hardening can be sufficiently restricted after long-term use (or after thermal aging) and an excellent vibration damping property can be obtained. Further, since the inventive vibration damping rubber composition includes a specific bismaleimide compound as a vulcanizing agent, crosslinking configuration thereof with a diene rubber becomes a C—C bond, in which bond energy is greater than a sulfide bond in the case of sulfur vulcanization, and the heat resistance of the composition is excellent. Still further, since n is an integer of 4 to 12 in the bismaleimide compound represented by the above-mentioned general formula (1) the distance between neighboring crosslinking points is lengthened, and, as a consequence, the thus obtained rubber composition is flexible and has excellent durability.

When a thiazole vulcanization accelerator is used as the above-mentioned vulcanization accelerator, crosslinking reactivity is improved.

When dibenzothiazyl disulfide (MBTS) or 2-(4-morpholinodithio) benzothiazole (MDB) is used as the above-mentioned vulcanization accelerator, crosslinking reactivity is further improved.

DETAILED DESCRIPTION OF THE INVENTION

The present invention will hereinafter be described in detail by way of embodiments thereof.

The vibration damping rubber composition according to the present invention can be obtained by using a diene rubber (component (A)), a specific bismaleimide compound (component (B)), and a vulcanization accelerator (component (C)).

The inventive vibration damping rubber composition includes only a specific bismaleimide compound (component (B)) as a vulcanizing agent, and does not include elemental sulfur as a raw material for a vulcanizing agent, which is an important feature of the present invention. In the present invention, elemental sulfur as a raw material means elemental sulfur for use in general rubber vulcanizagion.

The diene rubber (component (A)) is not specifically limited, however, examples thereof include natural rubbers (NR), isoprene rubbers (IR), butadiene rubbers (BR), styrene-butadiene rubbers (SBR) and acrylonitrile-butadiene rubbers (NBR), which may be used either alone or in combination. Among them, NR is preferably used in terms of a vibration damping property and durability.

The specific bismaleimide compound (component (B)), which is used with the diene rubber (component (A)), is a bismaleimide compound represented by the following general formula (1);

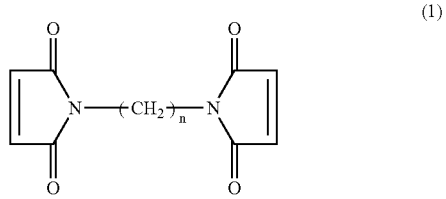

(1)

wherein n denotes an integer of 4 to 12.

In the above general formula (1), n denotes an integer of 4 to 12. When n is less than 4, the durability tends to deteriorate. When n is greater than 12, the crosslinking reactivity is low so that rubber properties are insufficient.

The blend ratio of the specific bismaleimide comDound (component (B)) is preferably 0.3 to 7 parts by weight (hereinafter just abbreviated to "part(s)"), particularly preferably 1 to 5 parts, based on 100 parts of the above-mentioned diene rubber (component (A)). When the blend ratio of the component (B) is less than 0.3 parts, crosslinking reactivity tends to deteriorate. To the contrary, when the blend ratio of the component (B) is greater than 7 parts, the resulting composition tends to have degraded physical properties (tensile strength at break and elongation at break) so that durability thereof may be deteriorated.

The vulcanization accelerator (component (C)), which is used along with the above components (A) and (B), is not specifically limited, however, examples thereof include thiazole compounds, sulfene amide compounds, thiuram compounds, aldehyde-ammonia compounds, aldehyde amine compounds, guanidine compounds and thiourea compounds, which may be used either alone or in combination. Among them, thiazole compounds are preferred in terms of excellent crosslinking reactivity. Further, use of a combination of thiazole compounds and thiuram compounds is particularly preferred in terms of the resultant excellent physical properties (tensile strength at break and elongation at break).

Examples of the thiazole compounds useful as a vulcanization accelerator include dibenzothiazyl disulfide (MBTS), 2-(4-morpholinodithio)benzothiazole (MDB), 2-mercaptobenzothiazole (MBT), sodium salt of 2-mercaptobenzothiazole (NaMBT) and zinc salt of 2-mercaptobenzothiazole (ZnMBT), which may be used either alone or in combination. Among them, dibenzothiazyl disulfide (MBTS) and 2-(4-morpholinodithio)benzothiazole (MDB) are preferred in terms of excellent crosslinking reactivity, and MDB is preferred in terms of excellent physical properties (tensile strength at break and elongation at break).

Examples of the sulfene amide compounds useful as a vulcanization accelerator include N-cyclohexyl-2-benzothiazyl sulfene amide (CBS).

Examples of the thiuram compounds useful as a vulcanization accelerator include tetramethylthiuram disulfide (TMTD).

The proportion of the vulcanization accelerator (component (C)) is preferably 0.3 to 7 parts, particularly preferably 0.5 to 5 parts, based on 100 parts of the above-mentioned diene rubber (component (A)). If the proportion of the component (C) is less than 0.3 parts, crosslinking reactivity tends to be inferior. If the proportion of the comoponent (C) is greater than 7 parts, the resulting composition tends to have degraded physical properties (tensile strength at break and elongation at break).

In addition to the above-mentioned components (A) to (C), one or more of carbon black, a vulcanizing aid, an antioxidant, a processing aid, a softener and the like may be added to the inventive vibration damping rubber composition, as required.

The vulcanizing aid which may be employed in the present invention is not particularly limited, but preferable examples thereof include zinc oxide (ZnO) and magnesium oxide, which may be used either alone or in combination.

The proportion of the vulcanizing aid is preferably 1 to 15 parts, particularly preferably 2 to 10 parts, based on 100 parts of the above-mentioned diene rubber (component (A)).

The antioxidant which may be employed in the present invention is not particularly limited, but preferable examples thereof include a carbamate antioxidant, a phenylenediamine antioxidant, a phenol antioxidant, a diphenylamine antioxidant, a quinoline antioxidant, an imidazole antioxidant and waxes.

The proportion of the antioxidant is preferably 1 to 7 parts, particularly preferably 2 to 5 parts, based on 100 parts of the above-mentioned diene rubber (component (A)).

The processing aid to be employed in the present invention is not particularly limited, but preferable examples thereof include stearic acid, fatty esters, fatty amides and hydrocarbon resins.

The proportion of the processing aid is preferably 1 to 5 parts, particularly preferably 1 to 3 parts, based on 100 parts of the above-mentioned diene rubber (component (A)).

The inventive vibration damping rubber composition may be prepared by blending a diene rubber (component (A)), a specific bismaleimide compound (component (B)), a vulcanization accelerator (component (C)), and any of the above-mentioned additives such as a processing aid or the like therein as required, and then kneading the resulting blend by means of a kneading machine such as a roll or a Banbury mixer.

Uses for the vibration damping rubber compositions of the present invention are not specifically limited, however, the compositions are preferably suitable for use in vibration dampers for automobiles such as engine mounts, stabilizer bushings and suspension bushings.

The vibration damping rubber formed by using the vibration damping rubber composition of the present invention can be produced, for example, by press-vulcanizing the thus prepared vibration damping rubber composition at specific conditions and forming the thus obtained product into a predetermined shape.

Next, an explanation will be given to Examples and Comparative Examples.

Prior to the explanation of Examples and Comparative Examples, ingredients employed in these examples will be set forth in detail.

Antioxidant A
N-(1,3-dimethyl-butyl)-N'-phenyl-p-phenylenediamine (OZONONE 6C, available from Seiko Chemical Co., Ltd. of Tokyo, Japan)

Antioxidant B
2,2,4-trimethyl-1,2-dihydroquinoline (NONFLEX RD, available from Seiko Chemical Co., Ltd. of Tokyo, Japan)

Carbon Black
FEF (Fast Extruding Furnace) grade carbon black (SEAST SO, available from Tokai Carbon Co., Ltd. of Tokyo, Japan)

Softener
Naphthene mineral oil

Bismaleimide Compound A
A bismaleimide compound represented by the above-mentioned general formula (1) wherein n is 4.

Bismaleimide Compound B
A bismaleimide compound represented by the above-mentioned general formula (1) wherein n is 12.

Bismaleimide Compound C
A bismaleimide compound represented by the above-mentioned general formula (1) wherein n is 6.

Vulcanization Accelerator (MBTS)
Sanceler DM available from SANSHIN CHEMICAL INDUSTRY CO., LTD. of Yamaguchi, Japan Vulcanization Accelerator (CBS) Sanceler CM available from SANSHIN CHEMICAL INDUSTRY CO., LTD. of Yamaguchi, Japan Vulcanization Accelerator (TMTD)
Sanceler TT available from SANSHIN CHEMICAL INDUSTRY CO., LTD. of Yamaguchi, Japan Vulcanization Accelerator (MDB)
NOCCELER MDB available from OUCHISHINKO CHEMICAL INDUSTRIAL CO., LTD. of Tokyo, Japan Vibration damping rubber compositions were prepared by using the above-mentioned materials as follows.

EXAMPLES 1 TO 12, COMPARATIVE EXAMPLES 1 AND 2

Each material was blended in the proportions as shown in the following Tables 1 and 2, and then the resulting blend was kneaded by means of a Banbury mixer for preparation of a vibration damping rubber composition.

Properties of the vibration damping rubber compositions thus produced for each of the Examples and each of the Comparative Examples were evaluated in the following manners. The results of the evaluations are also shown in the following Tables 1 and 2.

Initial Physical Properties

Each vibration damping rubber composition was press-molded at 160° C. for 30 minutes for preparation of a rubber sheet having a thickness of 2 mm in the shape of No. 5 dumbbell in accordance with Japanese Industrial Standards (hereinafter referred to as JIS). The tensile strength at break, the elongation at break and the hardness (JIS A) of the rubber sheet were measured in conformity with JIS K 6251.

Physical Properties after Thermal Aging

Using a vulcanized rubber sheet prepared in the same manner as in the above-mentioned manner, the elongation at break and the hardness (JIS A) were measured after thermal aging at 100° C. for 500 hours. The change (%) of the elongation at break was determined for the elongation at break after thermal aging while the difference from the initial hardness was determined for the hardness after thermal aging.

Spring Change

The stress at 100% elongation of a vulcanized rubber sheet prepared in the same manner as in the above-mentioned manner was measured in conformity with JIS K 6251 and 100% modulus change (%) was determined.

Durability

Each vibration damping rubber composition was press-molded at 160° C. for 30 minutes for preparation of a rubber sheet having a thickness of 2 mm. A flex test was conducted on the thus obtained rubber sheet in conformity with JIS K 6260 and the number of flexings was measured until the crack size reached 5 mm.

TABLE 1

(Parts by weight)

|  | EXAMPLE | | | | | | |
|---|---|---|---|---|---|---|---|
|  | 1 | 2 | 3 | 4 | 5 | 6 | 7 |
| Natural rubber | 100 | 100 | 100 | 100 | 100 | 100 | 100 |
| Stearic acid | 1 | 1 | 1 | 1 | 1 | 1 | 1 |
| ZnO | 5 | 5 | 5 | 5 | 5 | 5 | 5 |
| Antioxidant A | 2 | 2 | 2 | 2 | 2 | 2 | 2 |
| Antioxidant B | 2 | 2 | 2 | 2 | 2 | 2 | 2 |
| Carbon black | 40 | 40 | 40 | 40 | 40 | 40 | 40 |
| Softener | 5 | 5 | 5 | 5 | 5 | 5 | 5 |
| Bismaleimide compound A (n = 4) | — | — | — | — | — | — | 2 |
| Bismaleimide compound B (n = 12) | — | — | — | — | — | — | — |
| Bismaleimide compound C (n = 6) | 2 | 2 | 2 | 2 | 2 | 2 | — |
| Vulcanizing agent (Sulfur) | — | — | — | — | — | — | — |
| Vulcanizing accelerator (MBTS) | 0.3 | 2 | 7 | — | — | — | 2 |
| Vulcanizing accelerator (CBS) | — | — | — | — | — | — | — |
| Vulcanizing accelerator (TMTD) | — | — | — | 0.1 | 1 | 3 | — |
| Vulcanizing accelerator (MDB) | — | — | — | — | — | — | — |

TABLE 1-continued

|  | EXAMPLE (Parts by weight) | | | | | | |
|---|---|---|---|---|---|---|---|
|  | 1 | 2 | 3 | 4 | 5 | 6 | 7 |
| Initial properties | | | | | | | |
| Tensile strength at break (MPa) | 16 | 16 | 15 | 18 | 18 | 16 | 16 |
| Elongation at break (%) | 520 | 500 | 400 | 560 | 540 | 440 | 520 |
| Hardness (JIS A) | 55 | 55 | 57 | 53 | 54 | 56 | 55 |
| Physical properties after thermal aging | | | | | | | |
| Change of elongation at break (%) | −20 | −19 | −21 | −22 | −25 | −25 | −20 |
| Hardness change from the initial hardness | +1 | +1 | +1 | +1 | +2 | +3 | +1 |
| Spring change · 100% modulus change (%) | +20 | +21 | +18 | +20 | +23 | +26 | +18 |
| Durability | | | | | | | |
| Number of flexings (million) | 200< | 200< | 200< | 200< | 200< | 160 | 150 |

TABLE 2

|  | EXAMPLE | | | | | COMPARATIVE EXAMPLE (Parts by weight) | |
|---|---|---|---|---|---|---|---|
|  | 8 | 9 | 10 | 11 | 12 | 1 | 2 |
| Natural rubber | 100 | 100 | 100 | 100 | 100 | 100 | 100 |
| Stearic acid | 1 | 1 | 1 | 1 | 1 | 1 | 1 |
| ZnO | 5 | 5 | 5 | 5 | 5 | 5 | 5 |
| Antioxidant A | 2 | 2 | 2 | 2 | 2 | 2 | 2 |
| Antioxidant B | 2 | 2 | 2 | 2 | 2 | 2 | 2 |
| Carbon black | 40 | 40 | 40 | 40 | 40 | 40 | 40 |
| Softener | 5 | 5 | 5 | 5 | 5 | 5 | 5 |
| Bismaleimide compound A (n = 4) | — | 2 | — | — | — | — | — |
| Bismaleimide compound B (n = 12) | 2 | — | 2 | — | — | — | — |
| Bismaleimide compound C (n = 6) | — | — | — | 2 | 2 | — | 2 |
| Vulcanizing agent (Sulfur) | — | — | — | — | — | 3 | 3 |
| Vulcanizing accelerator (MBTS) | 2 | — | — | 2 | — | — | — |
| Vulcanizing accelerator (CBS) | — | — | — | — | — | 1 | — |
| Vulcanizing accelerator (TMTD) | — | 1 | 1 | 1 | — | 1 | — |
| Vulcanizing accelerator (MDB) | — | — | — | — | 2 | — | — |
| Initial properties | | | | | | | |
| Tensile strength at break (MPa) | 15 | 16 | 15 | 21 | 21 | 18 | 17 |
| Elongation at break (%) | 480 | 520 | 480 | 500 | 490 | 500 | 490 |
| Hardness (JIS A) | 55 | 55 | 55 | 55 | 55 | 57 | 56 |
| Physical properties after thermal aging | | | | | | | |
| Change of elongation at break (%) | −22 | −24 | −26 | −25 | −20 | −70 | −42 |
| Hardness change from the initial hardness | +1 | +2 | +2 | +2 | +1 | +7 | +5 |
| Spring change · 100% modulus change (%) | +18 | +25 | +27 | +25 | +23 | +80 | +65 |
| Durability | | | | | | | |
| Number of flexings (million) | 200< | 180 | 200< | 200< | 200< | 100 | 120 |

As is apparent from Tables 1 and 2, each of the vibration damping rubber compositions of Examples 1 to 12 was excellent in the initial physical properties, the physical properties after thermal aging and the vibration damping property.

On the contrary, since the vibration damping rubber composition of Comparative Example 1, which did not contain a bismaleimide compound as a vulcanizing agent and only contained a sulfur vulcanizing agent, had great change of the elongation at break, great change of hardness and great spring change after thermal aging, the vibration damping property was inferior. Since the vibration damping rubber composition of Comparative Example 2, which contained a bismaleimide compound and also contained a sulfur vulcanizing agent, had great spring change, the vibration damping property was inferior.

The vibration damping rubber compositions of the present invention are preferably suitable for use in vibration dampers for automobiles such as engine mounts, stabilizer bushings and suspension bushings.

What is claimed is:
1. A vibration damping rubber composition comprising:
(A) a diene rubber;
(B) a bismaleimide compound represented by the following general formula (1);

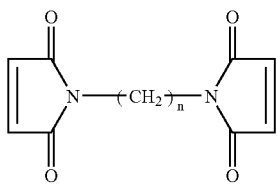
(1)
wherein n denotes an integer of 4 to 12;
(C) a thiuram vulcanization accelerator; and
(D) dibenzothiazyl disulfide or 2-(4-morpholinodithio) benzothiazole;
wherein said rubber composition does not contain elemental sulfur as a raw material for a vulcanizing agent.
2. A vibration damping rubber composition as set forth in claim 1, wherein the component (A) is natural rubber.
* * * * *